United States Patent [19]

Binzen

[11] Patent Number: 4,479,749
[45] Date of Patent: Oct. 30, 1984

[54] ROTARY CAR DUMPER INSTALLATION WITH INTEGRAL DUST COLLECTION

[75] Inventor: Willard Binzen, Medina, Ohio

[73] Assignee: Dravo Corporation, Pittsburgh, Pa.

[21] Appl. No.: 382,780

[22] Filed: May 27, 1982

[51] Int. Cl.$^3$ ............................................. B65G 67/50
[52] U.S. Cl. .................................... 414/291; 414/359; 414/371
[58] Field of Search ............... 414/291, 359, 360, 361, 414/366, 368, 371, 372, 576

[56] References Cited

U.S. PATENT DOCUMENTS

| 2,215,735 | 9/1940 | Jones | 414/360 |
| 2,575,869 | 11/1951 | Flowers | 414/359 |
| 2,659,500 | 11/1953 | Kincaid | 414/361 |
| 4,020,956 | 5/1977 | Van Hille | 414/291 |

FOREIGN PATENT DOCUMENTS

| 122565 | 9/1979 | Japan | 414/291 |
| 22614 | of 1898 | United Kingdom | 414/359 |
| 418418 | 7/1974 | U.S.S.R. | 414/359 |
| 652071 | 3/1979 | U.S.S.R. | 414/291 |

OTHER PUBLICATIONS

Dravo, Sample Sketch Sheet of Current Practice, p. 6.

Primary Examiner—Robert J. Spar
Assistant Examiner—Ken Muncy
Attorney, Agent, or Firm—Parmelee, Miller, Welsh & Kratz

[57] ABSTRACT

The dust collection units in a rotary railroad car dumper installation are mounted over the hopper pit along each side of the cylindrical, rotatable dumper frame so that dust ladened air can be sucked directly into the dust collection units without the need for duct work and the collected dust can be returned directly to the pit without the need for easily clogged screw conveyors and small chutes. The dust collection units also form with air shields mounted on the cylindrical dumper frame, a rotary valve which restricts flow such that ambient air is sucked into the hopper pit by the dust collection units at velocities which exceed the capture velocity of the dust clouds created by dumping of the contents of the car. The air shields include orthogonal pairs of planar members mounted on the rotary frame. One planar member extends outward from the top of one side of the car to be dumped such that the side of the car forms part of the air shield and the gap under the car forms, just as the car contents are being dumped, a longitudinal slot through which ambient air is sucked to sweep away the resultant billowing dust cloud.

9 Claims, 4 Drawing Figures

ROTARY CAR DUMPER INSTALLATION WITH INTEGRAL DUST COLLECTION

BACKGROUND OF THE INVENTION

1. Field of the Invention

This invention relates to apparatus for emptying railroad cars carrying bulk material by rotating them about their longitudinal axis to dump the contents over the sides of the cars into a hopper below. More particularly, it relates to such a rotary car dumper which incorporates an efficient, simplified dust collection system to contain the clouds of dust created by the dumping operation.

2. Prior Art

It is common practice to empty trainloads of bulk material by cycling the cars through a cylindrical frame which is rotated about a horizontal axis to dump the contents over the side of the car into a hopper underneath the rotatable frame. During the dumping operation billowing clouds of dust are usually created. While this was not considered a problem in earlier times, recent concern for the environment and for working conditions has resulted in steps being taken to contain these dust clouds. Under present practice, dust collectors are installed adjacent to the dumper structure on a separate foundation. This arrangement requires ducting of the dust ladened air from the hopper pit to the dust collectors as well as ducting of the cleaned air to the exhaust fans.

Because of the billowing nature of the dust clouds created during dumping, it is necessary that the duct system draws air into the openings around the hopper pit area at a rate which exceeds the dust capture velocity. That is, at a velocity which prevents puffs of dust from escaping through these openings and into the dumper building. This is difficult to achieve with the present ducted system and in any event requires large volume exhaust fans to maintain capture velocity across all of the air entrance areas. This in turn requires increased horsepower to satisfy duct losses which approach 50% of the designed horsepower requirement. The placement of the dust collectors on a separate foundation also requires that the dust collected in the dust collector hoppers must be transported back to the dumper pit through a maze of screw conveyors, rotary valves and chutes; all of which require constant maintenance. Some materials tend to cake which can plug up the system, especially at the screw conveyors, rotary valves and small ducts. Furthermore, the duct work which handles the dust ladened air is subject to wear at all points where it changes direction. These points also require frequent maintenance.

SUMMARY OF THE INVENTION

According to the present invention, the open area around the dumper pit of a rotary railroad car dumper is controlled so that capture velocity for the billowing dust clouds created by dumping can be maintained across all of the open areas without requiring excessively large exhaust fans. However, the object is not to eliminate all the openings since some air flow is desirable to help sweep the dust cloud from the pit. By controlling the location as well as the area of the openings, efficient dust collection can be realized.

Apparatus according to the invention is suitable for use with car dumpers already in service. Such dumpers include a cylindrical frame constructed of two end rings joined by elongated members with a section of railroad track extending through the frame parallel to its longitudinal axis. Such rotatable frames are closed on the circular ends except for an opening through which the railroad car enters and leaves the frame and are open on the sides.

In order to capture the dust created when the contents of the railroad car are dumped into the dumper pit located under the rotatable frame, the present invention provides fixed position enclosure means extending along each side of the rotatable frame between the end rings to enclose the space between the sides of the dumper pit and the sides of the rotatable, cylindrical frame. Planar air shields mounted on the open sided rotatable frame and extending between the end rings parallel to the longitudinal axis of the frame are arranged to form with the enclosure means, as the frame is rotated, a rotary valve which restricts the openings above the dumper pit such that ambient air is sucked through these openings by dust collection means at a velocity which exceeds the capture velocity of the dust cloud created by dumping of the railroad car contents.

The shield members on the rotatable frame preferably includes a pair of planar members extending in a common plane on each side of the railroad track section substantially from the track section outward to substantially the cylindrical surface defined by the frame. These planar members form with the fixed position enclosure means a restriction to the flow of ambient air into the dumper pit at selected points during the rotation of the rotatable frame. These selected points at least include the points where the common plane is horizontal, that is; where the railroad car is upright or upside down.

The air shields also include a second pair of planar members which extend outward substantially to the cylindrical surface defined by the rotatable frame in planes transverse to the common plane of the first pair of planar members. This second pair of planar members also forms with the enclosure means a restriction to the flow of ambient air into the dumper pit at selected points in the rotation of the cylindrical frame which include at least the points where the planes of this second pair of planar members are horizontal.

Preferably, one planar member in the additional pair of air shields extends outward along the side of a railroad car on the track section opposite the side over which the contents of the car are to be dumped, from about the top edge of the car substantially to the cylindrical surface defined by the frame. The other planar member in this pair extends substantially between the other side of the common plane and the cylindrical surface defined by the frame. With this arrangement, the side of the railroad car helps to restrict the openings through which ambient air can be sucked into the dumper pit as the frame is rotated to dump the contents of the car. At the same time, the space between the bottom of the car and the first pair of planar members which are in the common plane, forms a slot extending the length of the rotary frame. Ambient air is sucked through this slot by the dust collection means at a velocity which exceeds the capture velocity of the dust clouds generated by dumping the contents of the car. The ambient air sucked through this opening helps to sweep the dust cloud of the dumper pit and into the dust collection means.

In the preferred embodiment of the invention, the fixed position enclosure means extends upward and around a sufficient portion of the sides of the cylindrical frame such that as the frame rotates, one of the planar members is always adjacent the fixed position enclosure means on each side of the cylindrical frame to form therewith a restriction to the flow of ambient air into the dumper pit.

Also as a preferred feature of the invention, the dust collection means forms part of the fixed position enclosure means. In th preferred arrangement, the dumper pit is wider than the rotatable frame such that dust collection equipment with an intake in the bottom can be mounted so that it extends at least partly over the dumper pit. With this arrangement the dust ladened air from the dumper pits can be drawn directly into the dust collector without the necessity of duct work and the collected dust can be deposited directly into the dumper pit without the necessity of screw conveyors, rotary valves and additional duct work required by the prior art arrangements. Thus, the previously mentioned problems of difficulty in maintaining capture velocity with a ducted system, high duct losses, and wear and clogging of the ducts, screw conveyors and rotary valves is eliminated by the present invention.

DESCRIPTION OF THE PREFERRED EMBODIMENT

Figure 1:
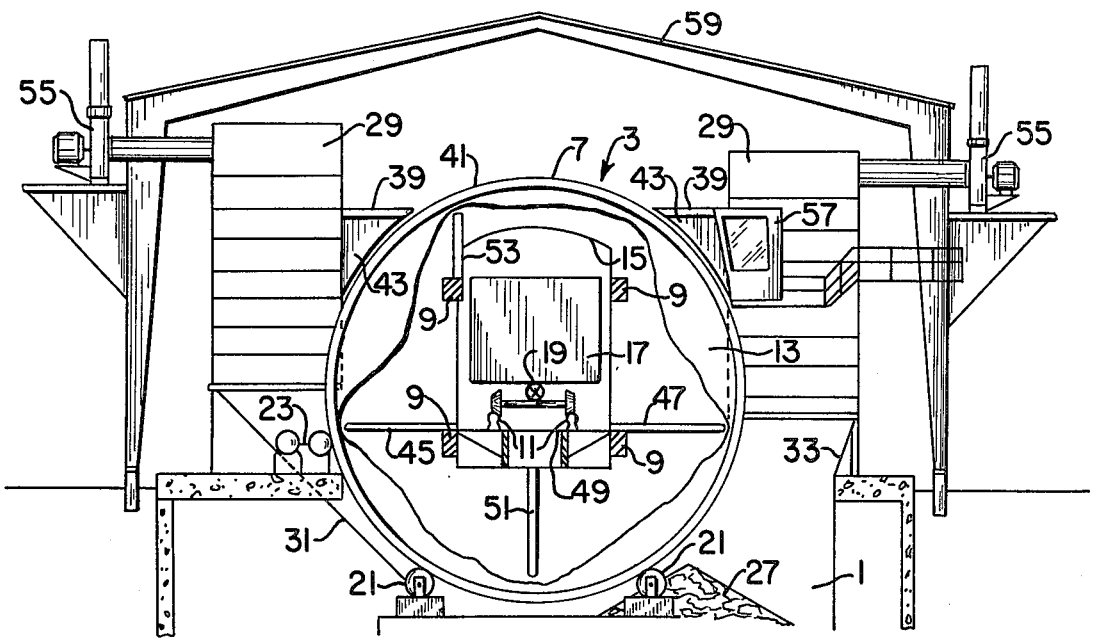
FIG. 1 is an end sectional view of a rotary car dumper installation incorporating the subject invention.
Figure 2:
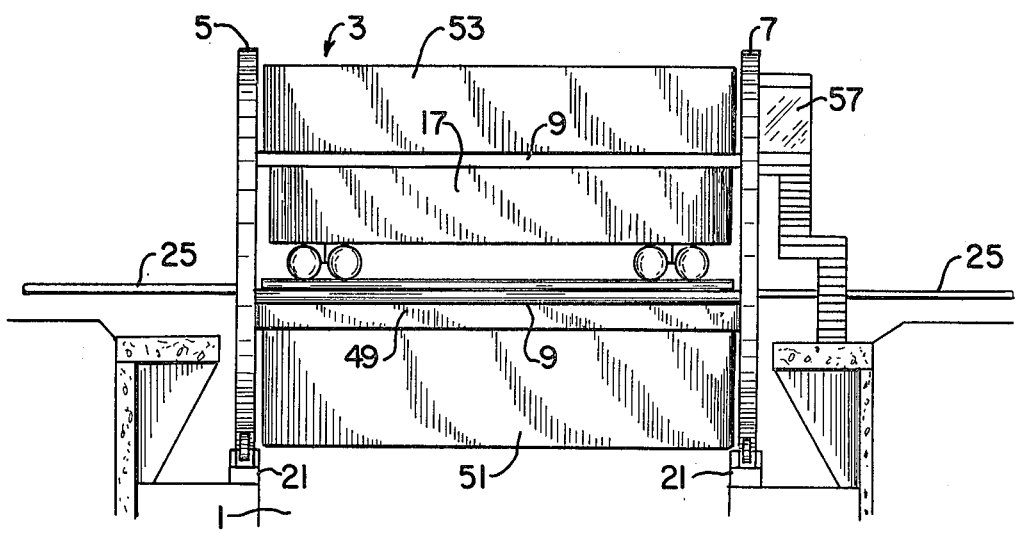
FIG. 2 is a side sectional view of the rotary car dumper installation of FIG. 1.
Figure 3:
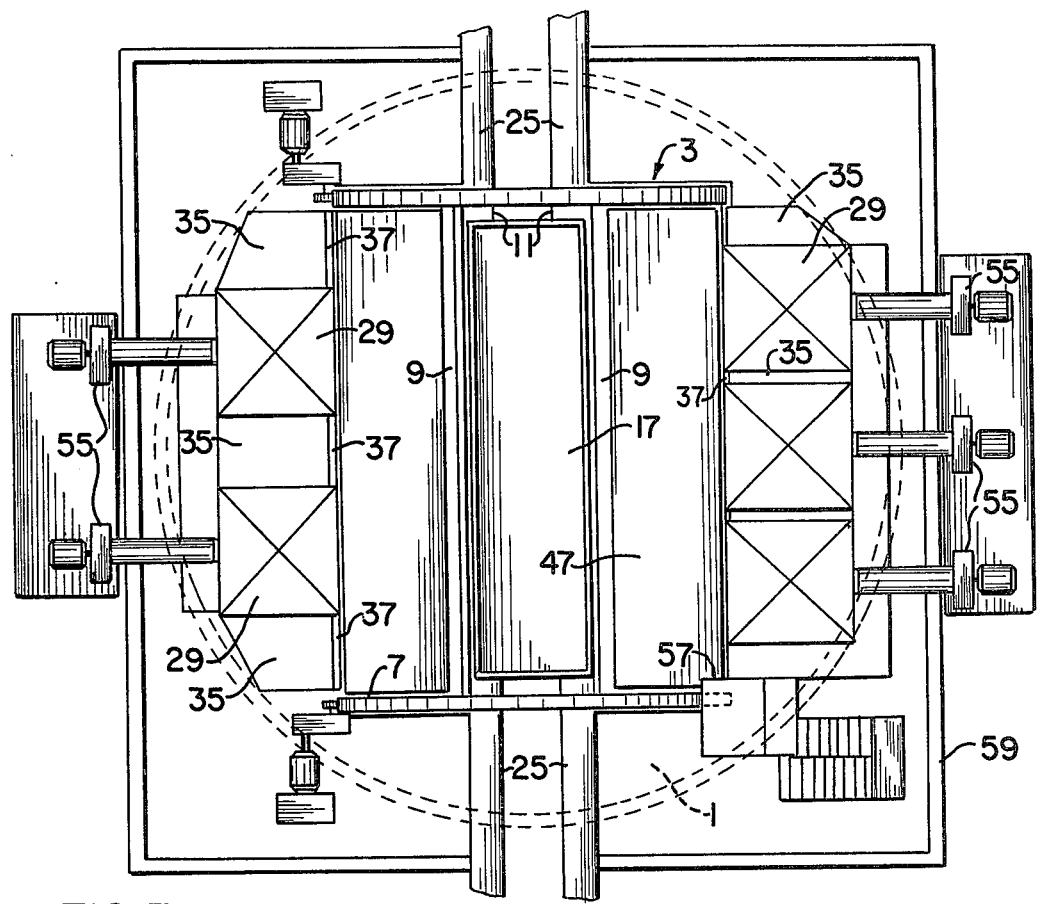
FIG. 3 is a plan view of the rotary car dumper installation illustrated in FIGS. 1 and 2.

As illustrated in FIGS. 1 through 3, a car dumper installation incorporating the present invention includes a hopper pit 1, which in the particular installation illustrated is circular in plan view, and a cylindrical, rotatable frame 3. The frame 3 is constructed of a pair of horizontally spaced end rings 5 and 7 interconnected by a number of girders 9 which also support a section of railroad track 11. The details of such a frame are well known in the art. Sufficient to say that the cylindrical frame is open at the sides but is enclosed at the ends by end plates 13 which are provided with openings 15 through which a railroad car 17 can pass.

The cylindrical frame 3 is mounted for rotation about its longitudinal axis 19 by a pair of trunions 21 under each end ring 5 and 7. The frame 3 is rotated by a motor gear reducer combinations 23 which also bear against the end rings 5 and 7.

With the frame 3 in the upright position shown in FIG. 1, the track section 11 is aligned with an external track system 25 (see FIG. 3) which may extend from one or both ends of the dumper so that the railroad car 17 can be positioned in the frame 3. It is common practice, but it is not essential to the present invention, to provide the cars with rotatable couplings and to position the track section 11 in the frame 3 with the coupling axis coextensive with the longitudinal axis 19 of the frame so that the cars can be individually rotated to dump their contents without uncoupling them from a train of cars. The car 17 is held in position on the track section 11 during rotation of the frame 3 by a set of clamps (not shown) as is well known in the art. As the frame is rotated about the longitudinal axis 19 by the motor gear reducer units, for instance in the clockwise direction as viewed in FIG. 1, the contents of the car are dumped over one side into the hopper pit 1 as is evident from FIG. 3. The bulk material 27 dumped into the pit is received by hoppers (not shown) for disposition by take away equipment (not shown) in a well known manner.

Dumping of most bulk materials into the hopper pit 1 creates billowing clouds of dust. In order to contain this dust, a number of dust collection units 29 are mounted along each side of the rotating frame 3. These dust collection units may be, for instance, bag type dust collectors. The number of units is related to the capacity of the selected units and the total demand of the installation. In the example illustrated, five units are utilized, three on one side of the rotatable frame 3 and two on the other. The dust collection units 29 have bottom intakes and the hopper pit 1 is wider than the frame 3 such that the dust collectors may be mounted over the hopper pit for direct intake of dust ladened air. With this arrangement dust collected by these units can be dumped directly into the hopper pit during the dust collector cleaning cycle. Baffles 31 and 33 close off the peripheral openings between the hopper pit 1 and the bottom of the dust collector units 29 and provides chutes to direct the collected dust toward the center of the pit. Additional horizontal baffles 35 close off the openings between the pit and the dust collection units on each side of the cylindrical frame between the end rings 5 and 7.

The dust collection units 29 in extending upward alongside of the rotatable, cylindrical frame 3 help to control the flow of ambient air through the open sides frame into the hopper pit. Baffles 37 enclose the vertical gaps between the dust collection units 29. Additional baffles 39 cantilevered out from the dust collection units 29 complete the enclosure means alongside the frame 3 by reducing the opening to ambient air through the cylindrical surface defined by the frame 3 to a longitudinal slot 41 extending along the top of the frame between the end rings 5 and 7. Panels 43 close off the space between the end rings and the vertical baffles 37.

In order to restrict the flow of ambient air through and around the frame 3 during car dumping and to assist in sweeping the billowing dust clouds created during dumping operations from the hopper pit, the rotatable frame 3 is provided with air shields. The air shields include a first pair of planar members 45 and 47 extending outward in a common plane from either side of the track section 11 substantially to the cylindrical surface defined by the frame 3. Since the platen 49 supporting the track section 11 is uninterrupted by openings, a continuous barrier is provided across the frame 3 in the plane of the track section. The air shields also include a second pair of planar members 51 and 53 each in a plane perpendicular to the common plane of members 45 and 47. The member 51 extends down as seen in FIGS. 1 and 2, from the center line of the track section 11 to the cylindrical surface defined by the frame 3 while member 53 extends outward from about the top of railroad car 17 to the cylindrical surface along the side of car 17 opposite that over which the load is dumped as the frame is rotated. Thus as seen in FIG. 1, where the frame rotates clockwise, the planar number 53 is mounted along the counterclockwise side of the car 17. All of the planar members 45, 47, 51, and 53 extend the length of the frame 3 between the end rings.

Figure 4:
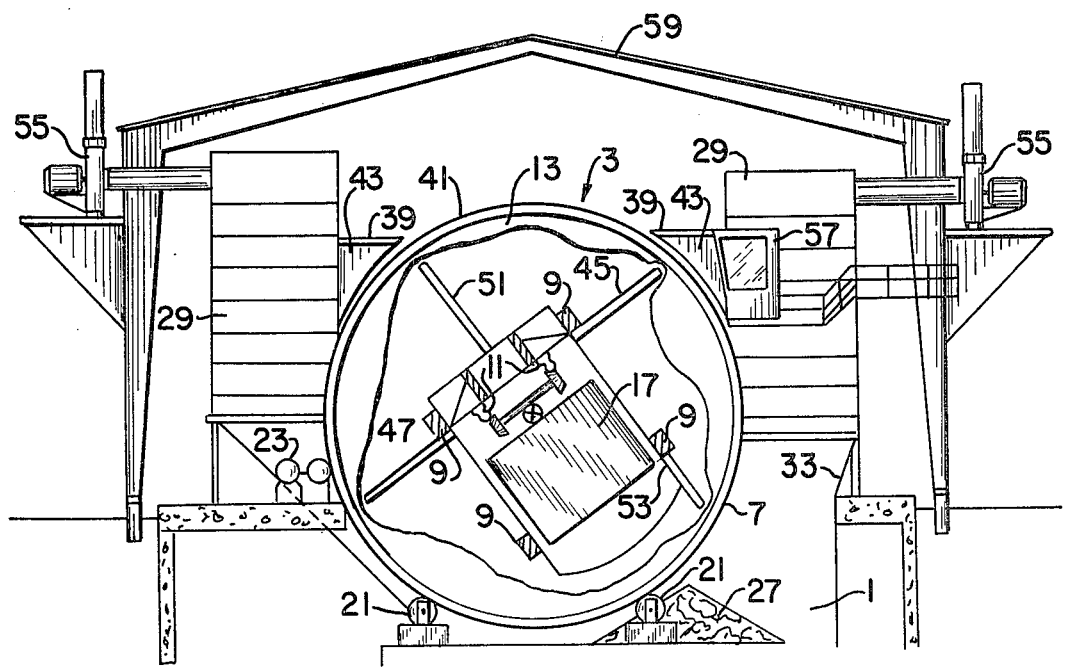
FIG. 4 is an end sectional view similar to the view shown in FIG. 1 but with the car dumper rotated to dump the contents of a railroad car into the dumping pit.

The frame 3 including the planar air shields 45, 47, 51 and 53 and the car 17 form with the fixed position enclosure means including dust collection units 29 and baffles 35, 37, 39 and 43 a rotary valve which restricts, but does not totally prevent, the flow of ambient air into the hopper pit 1. The restrictions are sized such that with the exhaust fans 55 sucking dust ladened air from the hopper pit 1 through the dust collection units 29, ambient air is drawn in through the restricted openings at a velocity which exceeds the capture velocity of the billowing dust clouds. With the frame 3 in the upright position shown in FIGS. 1 and 2, the restriction is between the planar members 45 and 47 and the dust collection units 29. As the car rotates clockwise through about 90°, the planar members 51 and 53 and the side of railroad car 17 cooperate with the fixed enclosure means to provide the restricted openings. Since the side of the car does not extend all the way down to the track section 11, a longitudinal gap exists around the wheels of the car 17. This path for ambient air is created at about the same time that the cloud of dust from the dumped material billows up, and it provides a stream of air which sweeps the dust cloud into the dust collection units. As the car rotates to the position shown in FIG. 4 the planar members 45 and 47 again begin to restrict the ambient air openings. It will be observed from FIGS. 1 and 4 that there is always one planar member cooperating with the fixed position enclosure means on each side of the frame 3 for all rotatable positions of the frame. The entire operation is controlled and monitored by an operator located in a cab 57 which is cantilevered out toward the end ring on one side of the rotatable frame 3. The entire dumper can be enclosed in a dumper building 59 as is conventional.

The disclosed arrangement makes a compact, effective car dumper installation. The size of the restrictions to ambient airflow are always such that dust cloud capture velocity is always exceeded without the need for unnecessarily oversized dust collection equipment. The unique arrangement of air shields on the rotatable dumper frame employs the side of the car as part of the shield and uses the gap under the car to generate a draft which sweeps the dust cloud out of the hopper pit. By locating the dust collection units over the hopper pit, they serve as part of the side enclosure for the rotatable frame and at the same time eliminate the need for the duct work required in the prior art arrangements. Elimination of the duct work not only lowers installation costs but it also eliminates duct losses which reduces exhaust fan capacity required and operating costs. Furthermore, collected dust can be returned directly to the hopper pit thereby eliminating the screw conveyors, rotary valves and clogged chutes associated with previous designs.

While a specific embodiment of the invention has been described in detail, it will be appeciated by those skilled in the art that various modifications and alternatives to the details of that embodiment could be developed in light of the overall teachings of the disclosure. Accordingly, the particular arrangement disclosed is meant to be illustrative only and not limiting as to the scope of the invention which is to be given the full breadth of the appended claims and any and all equivalents thereof.

What is claimed is:

1. Rotary car dumper apparatus comprising:
    a rotatable frame comprising a pair of vertically oriented, horizontally spaced end rings connected by elongated members to form an open sided cylindrical frame with a horizontal longitudinal axis and having a section of railroad track extending through the frame parallel to said longitudinal axis, said frame including end plates at said end rings enclosing the ends of said cylindrical frame except for an opening through which a railroad car can pass through said frame on said section of track;
    a hopper pit under said cylindrical frame for receiving bulk material carried by said railroad car, a portion of said cylindrical frame below said section of railroad track extending downward into said hopper pit;
    means for mounting said cylindrical frame through said end rings for rotation about said longitudinal axis to dump bulk material over one side of said railroad car into said hopper pit;
    fixed position enclosure means extending along each side of said rotatable frame between the end rings to enclose the space between the sides of said hopper pit and the cylindrical sides of said rotatable frame and to enclose the open sides of the frame;
    dust collection means for sucking dust ladened air from said hopper pit; and
    planar air shields mounted on said open sided rotatable frame and extending between said end rings parallel to the longitudinal axis of said frame, said planar air shields being arranged to form with the enclosure means as said cylindrical frame is rotated to dump the contents of said railroad car into the hopper pit, a rotatable valve which forms restricted openings above the hopper pit and the railroad car as it is rotated beyond the point where the contents begin to dump, such that ambient air is sucked through these openings by the dust collection means at a velocity which exceeds the velocity required to capture a dust cloud created in the hopper pit and below the railroad car by dumping of the railroad car contents.

2. The apparatus of claim 1 wherein said air shields include a pair of planar members extending in a common plane, on each side of the section of railroad track, substantially from said railroad track outward to substantially the cylindrical surface defined by said cylindrical frame to form with said fixed position enclosure means a restriction to the flow of ambient air into the hopper pit at selected points during rotation of the cylindrical frame.

3. The apparatus of claim 2 wherein said selected points at least include those points during rotation of said cylindrical frame when said common plane is substantially horizontal.

4. The apparatus of claim 3 wherein said air shields further include an additional pair of planar members extending outward substantially to the cylindrical surface defined by said cylindrical frame in planes substantially transverse to said common plane, said additional air shields also forming with said fixed position enclosure means a restriction to the flow of ambient air into said hopper pit at selected points during rotation of said cylindrical frame including at least the point where the planes of said additional planar members are substantially horizontal.

5. The apparatus of claim 4 wherein one planar member in said additional pair of air shields extends outward on one side of said common plane, along the side of a railroad car on said track section opposite the side over which the contents of the car are dumped, from about the top edge of the car substantially to the cylindrical surface defined by said cylindrical frame, and wherein the second planar member in said additional pair of air shields extends outward on the other side of said common plane substantially from said common plane to substantially the cylindrical surface defined by said cylindrical frame such that as said cylindrical frame rotates to dump the contents of the railroad car into the hopper pit said additional air shields cooperate with said fixed position enclosure means and the side of the railroad car to restrict the flow of ambient air into the hopper pit, the space between the bottom of the car and said common plane providing an opening through which ambient air can be sucked into the hopper pit by the dust collection means at a velocity which exceeds the capture velocity of the dust cloud created by the dumping to sweep said dust cloud out of the hopper pit into the dust collection means.

6. The apparatus of claim 5 wherein said fixed position enclosure means includes means extending upward and around a sufficient portion of each side of the cylindrical frame such that as the cylindrical frame rotates there is always one of said planar members adjacent the fixed position enclosure means on each side of the frame to form therewith a restriction to the flow of ambient air into the hopper pit around the radially outer edge of a planar member.

7. The apparatus of claim 1, 2 or 6 wherein said dust collection means forms a part of said fixed position enclosure means.

8. The apparatus of claim 7 wherein said hopper pit is wider than said cylindrical frame and wherein said dust collection means has intake means at the bottom thereof and is mounted at least partially over the hopper pit such that dust ladened air is drawn directly from the hopper pit into said dust collection means.

9. The apparatus of claim 8 wherein the dust collection means includes means for discharging collected dust directly back into the hopper pit.

* * * * *